(12) United States Patent
Baur et al.

(10) Patent No.: US 6,529,819 B2
(45) Date of Patent: Mar. 4, 2003

(54) METHOD OF EVALUATING TRAFFIC INFORMATION

(75) Inventors: Reinhold Baur, Neu-Ulm (DE); Anne Koppinen, Tampere (FI); Anne Kirjavainen, Espoo (FI); Maximiliano Roque-Cerna, Gunzburg (DE); Lutz Abe, Erbach (DE); Peter Prestele, Vohringen (DE)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/876,444

(22) Filed: Jun. 7, 2001

(65) Prior Publication Data

US 2002/0016667 A1 Feb. 7, 2002

(30) Foreign Application Priority Data

Jun. 9, 2000 (DE) ........................... 100 28 661

(51) Int. Cl.$^7$ .............................................. G06F 19/00
(52) U.S. Cl. ................. 701/117; 701/118; 701/200; 701/201; 701/211; 701/66; 342/357.09; 340/990; 340/905; 340/907
(58) Field of Search ................................ 701/117, 118, 701/119, 200, 201, 66, 207, 211, 212; 342/357.01, 357.09; 340/988, 990, 991, 992, 905, 907

(56) References Cited

U.S. PATENT DOCUMENTS 5,680,143 A  * 10/1997 Hershey et al. ............. 342/375
5,911,773 A     6/1999 Mutsuga et al. ............ 701/200

FOREIGN PATENT DOCUMENTS

| DE | 19539641 A1 | 4/1997 |
| DE | 19644689 A1 | 4/1998 |
| DE | 19810173 A1 | 10/1999 |
| EP | 0788067 A1 | 8/1997 |
| EP | 0795835 A1 | 9/1997 |
| WO | WO 98/26253 | 6/1998 |
| WO | WO 98/28727 | 7/1998 |

OTHER PUBLICATIONS

Patent Abstracts of Japan document No. JP 09061185.
Patent Abstracts of Japan document No. JP 08082527.
Patent Abstracts of Japan, Publication No. 10049798.

* cited by examiner

*Primary Examiner*—Gertrude Arthur
(74) *Attorney, Agent, or Firm*—Perman & Green, LLP

(57) ABSTRACT

A method of evaluating traffic information transmitted by a traffic information service, in which data on the traffic situation on a route to be traveled in the present direction of travel is received and, from the data on the traffic situation, an anticipated delay in journey time on the route to be travelled is calculated. In order to avoid unnecessary waiting in traffic hold-ups it is provided that the size of the calculated anticipated delay in journey time together with a recommendation to interrupt the journey is displayed if the anticipated delay in journey time in the present direction is greater than a given value.

9 Claims, 2 Drawing Sheets

METHOD OF EVALUATING TRAFFIC INFORMATION

DESCRIPTION

1. Technical Field

The invention relates to a method of routing to a destination by using navigation devices.

2. Prior Art

Methods for evaluating and using traffic information, in particular in navigation devices or systems for routing are generally known in the prior art, so there is no need for detailed disclosure of the various steps. For example, it is known to give general or individual recommendations of diversions on the basis of information about traffic congestion. Regardless of the functioning mode of routing aids, designated as navigation devices, in individual cases, navigation devices are capable of indicating to the user the route to a desired destination starting from the position at that moment.

The present position is identified, for example, by a GPS sensor (Global Positioning System). These data are then linked to the data of the desired destination and the route to the destination worked out. Once this process is complete, the user is informed of the results of the routing acoustically or visually, the "execution" of the route the desired destination being monitored by appropriate sensors. The latter ensures, for example, that, on leaving the worked out route, the driver receives an instruction or else the navigation device works out a new routing to the destination adapted to the changed conditions, based on the new situation.

Optionally it can be provided in navigation devices that they work out not just one route to the destination, but provide a multiplicity of possibilities for reaching the destination and from these possibilities output to the user the shortest or fastest connection, depending on which of these possibilities the user chooses or presets.

It is further known that the user can file specific points of interest to him/her on route in a memory device. If, for example, the user is interested in a particular kind of museum he/she can lodge this interest in one of the storage locations in the memory device. This then results in the user being shown on his/her journey how to reach quickly one of the museums he/she is interested in. If the user does confirm he/she wants to visit the museum shown, because he/she has some time, he/she is then guided to the museum using the navigation system. To keep the display of interesting points on route within bounds, it can be provided, for example, that—to keep to our example—only those are offered which lie within a radius which can be set by the user. Also, for the same reasons, display of museums the user has already visited can be suppressed.

Further, combination of navigation devices with services is also known, which, depending on the route or routes worked out, provide data on the state of the roads and/or the traffic situation on these routes. These data provided by the respective service serve, for example, to work out alternative routes to the destination, by which the user can reach his/her destination without interruption and with as little congestion as possible, if there are jams on the preferred routes.

It is often the case, however, that in peak traffic hours not only the main route but also the alternative routes are blocked. It can also occur that there are no alternative routes available. This undeniably results in vehicle drivers spending varying amounts of time wasted in jams.

Therefore the object of the invention is to provide a further method of evaluating traffic information which makes it possible to avoid pointless waiting in traffic hold-ups.

SUMMARY OF THE INVENTION

This object is achieved by the method according to claim 1. Advantageous developments and further developments of the invention are found in the subordinate claims.

According to the invention it is therefore provided in an initially mentioned method for evaluating traffic information transmitted by a traffic information service that the size of the calculated anticipated delay in journey time together with a recommendation to interrupt the journey is displayed if the anticipated delay in journey time in the present travel direction is greater than a given value.

An advantageous further development of the method according to the invention is characterised in that before the recommendation to interrupt the journey is displayed an alternative route is worked out and the delay in journey time using the alternative route is calculated and the display of the recommendation to interrupt the journey is output if the shortest of the worked out anticipated delays in journey time is greater than the given value.

In this way is ensured that users of the method according to the invention receive adequate information on the traffic situation on the route in front of them to tide them sensibly over times of traffic congestion.

It is advantageous therein if the given value can be pre-determined by users. In this way it is possible for users to decide in advance from what length of delay they would like their attention to be drawn to the possibility of interrupting their journey. If, for example, a truck driver wishes to use times of congestion to comply with his obligatory resting times, a minimum length of the break is required to keep to the regulations.

Another configuration of the invention is characterised in that a route guide to a particular interesting point on route is offered if the time needed for the visit to the interesting point on route as a given value is less than the worked out anticipated delay in journey time, the time needed for the visit to the interesting point on route being calculated from the length of the journey there and back as well as a pre-determinable or pre-determined length of stay at the interesting point on route.

Thus it can be ensured that in visiting the interesting point on route no loss of time occurs, as the time needed for the journey there and back is less than the delay caused by the congestion.

More accurate time details are achieved if in the calculation of the time needed for the visit to the interesting point on route the types of roads to be used on the way to the interesting point on route, the maximum speeds permitted on them and possibly the previous driving behaviour of the user are taken into account.

Advantageously it can be provided that the user's points of interest on route and/or categories of points of interest on route can be pre-determined.

BRIEF DESCRIPTION OF THE DRAWINGS

The invention will be described in greater detail below using the drawings.

WAYS OF CARRYING OUT THE INVENTION

Figure 1:
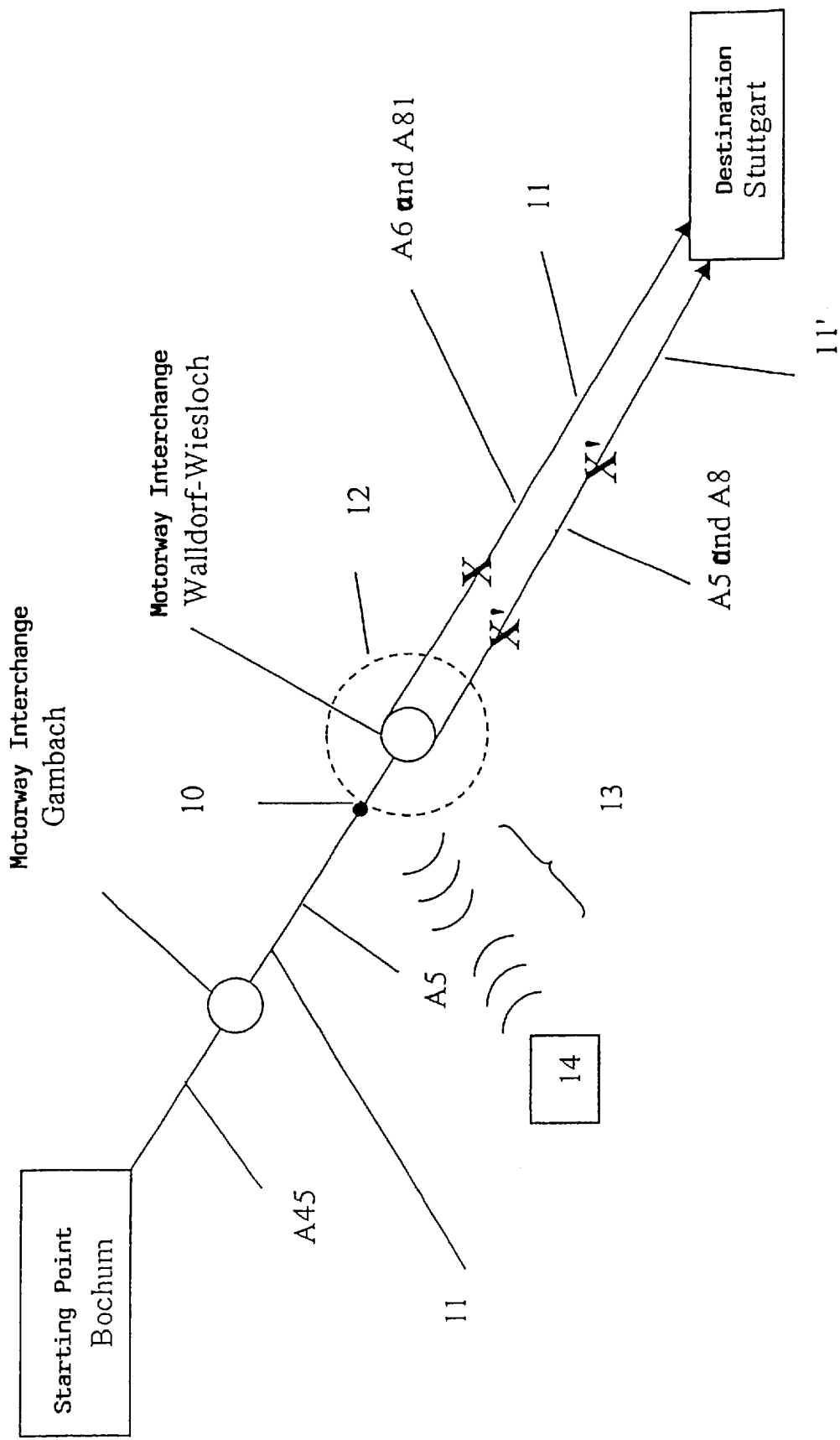
FIG. 1 shows an example of a journey from Bochum to Stuttgart.

In FIG. 1 a journey from Bochum to Stuttgart is described. As the driver wishes to be guided on this journey by the navigation system (not shown) of his/her vehicle 10, before starting the journey in Bochum he/she input the exact destination data of town and street. A system installed in the vehicle can be provided as navigation system. It is also conceivable, however, to use a navigation system for routing to which the route information is transmitted by a service provider via an air interface or route, which is formed, for example, from a radio communications system or a mobile radio connection. In accordance with these destination data the driver is led via the A45 motorway to the Gambach motorway interchange and there receives the instruction to turn on to the A5 motorway in the Frankfurt direction.

On his/her route 11 to Stuttgart the vehicle 10 at some point on the A5 motorway reaches the area of the Walldorf-Wiesloch motorway interchange. This area is designated as 12 in FIG. 1. At this motorway interchange, as the navigation system in the previous example is programmed to the shortest route, the driver would in normal circumstances receive the instruction to turn on to the A6 motorway in the Heilbronn direction at the Walldorf-Wiesloch interchange.

As indicated by the radar route 13, the vehicle 10 is in data exchange with a service provider 14, so road traffic reports for the route leading to the destination or destinations are made continually or periodically available to the navigation system in the vehicle 10. As, according to the above assumption, the driver wishes to be guided in his/her journey from Bochum to Stuttgart by the navigation system, he/she receives from the service provider the relevant traffic reports for the worked out route 11.

If, for example, there is a traffic jam (indicated by an X) of about 15 km in length on the A6 motorway owing to heavy holiday traffic, the time required to bridge the am is calculated by the service provider and communicated to the navigation system. If this time exceeds a fixed scale, an alternative route 11' is worked out starting from the current location of the vehicle 10. In the present case it has been assumed that a delay of more than 10 minutes has been set as the value for introducing the working out of an alternative route 11', so, if it is worked out that there will be a delay on route 11 of one hour and 45 minutes, working out an alternative route 11' will be started on immediately. At the Walldorf-Wiesloch interchange this alternative route 11' leads to the destination Stuttgart via the A5 and A8 motorways. Traffic information is recalled by the service provider 14 for this alternative route 11' too. If the traffic information received for the alternative route 11' also produces jams (indicated by X) with a total length of 16 km or with a delay time of one hour and 30 minutes, the size of the calculated anticipated delay in journey time is displayed to the driver together with a recommendation to interrupt the journey. In addition an alternative use of the times of congestion can be suggested.

Thus it is possible for business travellers to carry out more important activities during a journey to a destination than spending a longish time in a traffic jam. It would be conceivable, for example, for drivers to pre-determine a minimum time which enables them to read their e-mails in the vehicle at a car park on the way or to make an important phone call. As soon as it is recognised according to the invention that it is more sensible to drive into a car park instead of sitting in the traffic jam, the navigation system can suggest driving into the nearest car park.

Furthermore, with the method according to the invention it could be ensured that truck drivers can more easily comply with the compulsory rest times, in that according to the invention a rest break is suggested, in a car park, for example. Here too drivers can, for example, pre-determine a minimum time necessary to make it worthwhile. If the traffic situation happens to improve before this rest time has elapsed, the system according to the invention will wait with a message to drive on long enough for the minimum break time to elapse.

The relevant steps for routing to an interesting point on route will now be explained below. If the driver is particularly interested in golf, for example, and/or has a particular predilection for regional wines, he/she can inform the navigation system of this. Users of the method according to the invention can therefore select one or more categories of interesting points on route which interest them, so in delays caused by jams they can use the waiting times arising from them according to their private and/or professional interests.

If the appropriate entries have been made and the driver arrives at a traffic situation, explained in greater detail in FIG. 1, in which the route 11 and the alternative route or alternative routes 11' result in delays caused by jams, the driver is offered, according to his/her previously set inclinations, an alternative programme to the jam by being guided to interesting points on route, corresponding to his/her previously set inclinations. A condition for routing to interesting points on route is, however, that the delay times caused by the jam are greater than or the same as the time needed to reach the interesting point on route. Based on the two delay times of one hour and 45 minutes and one hour and 30 minutes, the shortest delay time in each case is made the measure of things. This means that a point on route of interest to the driver is looked for within a radius of one hour and 30 minutes.

If, for example, there is a golf course at a distance of 5 km from the Walldorf-Wiesloch interchange this golf course is indicated to the driver and routing to it offered if the time needed to reach the golf course is the same or less than the period of delay caused by a jam of one hour and 30 minutes. To work out how long is needed to bridge the 5 km from the Walldorf-Wiesloch motorway interchange to the golf course, on the one hand the types of roads to be used and the driving behaviour of the user on the respective types of road in the past are used as a basis. If you reach the golf course near the Walldorf-Wiesloch interchange via an expressway and if the user has driven on expressways in the past at an average of 80 km per hour, a driving time of around 7 minutes is worked out from these figures.

To obtain more accurate data on the travel time to the golf course, figures from the service provider 14 can also be used, if, for example, it has available the permissible maximum speeds for the roads to be used.

As this value of 7 minutes is below the value for the delay of one hour and 30 minutes caused by the jam the user is offered the golf course as an alternative to the jam and routing to it carried out if the user confirms this.

As can easily be seen, the search for a point on route of interest to the user should not be completely determined by the delay caused by a jam, as, apart from the time taken for the journey to the interesting point on route, the way back and a suitable time to spend there must be allowed. It is perhaps a good compromise if 15 to 25% of the delay caused by the jam is used as a guideline for the search for an interesting point on route.

If you want to rule out the use of compromise values it can also be provided that only those points on route are indicated to the driver in which the time needed for travelling there and back is less than the delay time caused by the jam. In this way it is ensured that no delays are caused by travelling to the interesting point on route. As well as the journey there and back the time spent there would also have to be taken into account. This can, for example, be done by the user, by pre-determining a time spent for specific groups of interesting points on route. The device can also be constructed in such a way that if the user has him/herself routed to interesting points on route, an average length of time spent there is worked out from this, which is then added to the length of time for the journey there and back.

Even if it has previously been assumed that routing occurs only to points on route previously entered by the user and of interest to him/her, it is possible that even if the user has given no details on points on route of interest to him/her, one or more suggestions on generally interesting points on route are made for bridging times of congestion. It can be formulated, for example, so that a visit to a museum or a shopping centre nearby is suggested to the user.

If from the general range of suggestions the user often chooses cafes, for example, if the navigation system is constructed as adaptive, this frequency can be taken as a reason for suggesting as a first approach only cafés as a pleasant way of bridging congestion times in later delays caused by jams.

It is further conceivable that when choosing routes users will themselves input points on route of personal interest, such as, for example, the addresses of friends living beside the chosen route.

Figure 2:
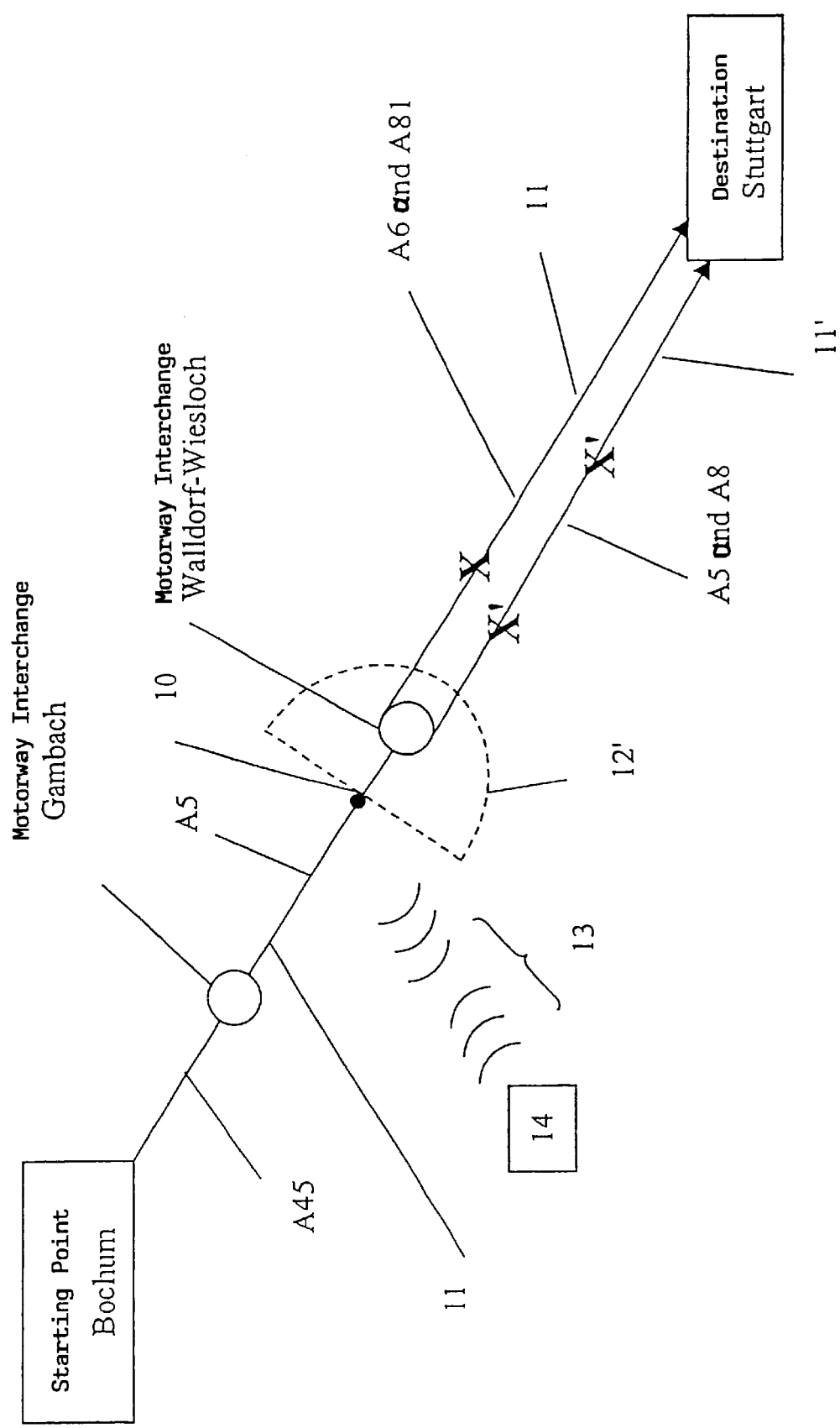
FIG. 2 shows a further embodiment example according to FIG. 1.

FIG. 2 also represents an example of a journey from Bochum to Stuttgart. By contrast to the example according to FIG. 1 the driver is not using routing to a destination. In order to benefit from the advantages of the method according to the invention when the driver operates the car in this way, it is necessary that the geographical position of the vehicle is beamed at specific times. This information can then be used by the service provider to work out the probable direction of travel. If, for example, the driver starts out in Bochum, it is soon clear from his/her use of the A45 motorway that the driver is moving with his/her vehicle 10 more or less southward. This information can be taken as a reason for the navigation system to be further supplied only with traffic information for an area located, for example, in a semi-circle 12' of 50 km in front of the vehicle 10.

If, for example, the navigation system receives the message before the Walldorf-Wiesloch motorway interchange that delays caused by congestion are expected both on the A5 motorway and on the A6 motorway, the delay times on the motorways in question are displayed to the driver together with the question of whether an alternative which cuts out driving in queues in the jam and offers an interesting point on route should be looked for. If the driver triggers a search for an interesting point on route he/she will be offered, as already in connection with the embodiment example described in FIG. 1, an interesting point on route within the window of time arising from the delay caused by congestion and routing to the interesting point on route chosen by the driver activated. So the driver is routed to the chosen interesting point on route for a pleasant way to bridge the time of congestion.

As the respective traffic information issued by the service providers 14 is not static, but subject to constant changes, it can be provided that, for example, if the delay times already output are extended, the user is informed of this situation, so that he/she can extend the time spent at the interesting point on route. The latter can be done in such a way that if the user has had him/herself routed to an interesting point on route this is registered and if the delay caused by the jam is extended he/she receives a message, for example as an SMS on his/her mobile telephone that he/she can spend a further 30 minutes at the present place without losing time. This sequence can also be used if, for example, the jam clears considerably more quickly than originally assumed. If it emerges that the jam on the A6 will have cleared after one hour, in this case too the user can receive a message on his/her mobile phone informing him/her of this change.

The method according to the invention can therefore be provided as part of a navigation system or work independently of it. The whole process can be run by a service provider, which, for example, communicates with the navigation device in the vehicle via a mobile radio connection. The individual steps of the process can also, however, be carried out in an appropriate device in the vehicle, wherein it is also conceivable to use traffic news received via the car radio. Additionally it is also possible to divide the individual steps of the method according to the invention between an appropriate end device in the vehicle and the service provider centre.

What is claimed is:

1. Method of evaluating traffic information transmitted by a traffic information service, in which:

data on the traffic situation on a route to be travelled in the present direction of travel is received and from the data on the traffic situation an anticipated delay in journey time on the route to be travelled is calculated, characterised in that the size of the calculated anticipated delay in journey time together with a recommendation to interrupt the journey is displayed if the anticipated delay in journey time in the present direction is greater than a given value.

2. Method according to claim 1, characterised in that before the recommendation to interrupt the journey is displayed an alternative route is worked out and an alternate route delay in journey time using the alternative route is calculated; and the display of the recommendation to interrupt the journey is output if a shortest of the anticipated delay and the alternate route delay in journey time is greater than the given value.

3. Method according to claim 1, characterised in that the given value can be pre-determined by a user.

4. Method according to claim 1, characterised in that routing to a specific interesting point on route is offered, if a visit time needed for a visit to the interesting point on route as a given value is less than the anticipated delay in journey time.

5. Method according to claim 4, characterised in that the visit time needed for the visit to the interesting point on route is calculated from the length of the journey there and back and from a pre-determinable or pre-determined length of stay at the interesting point on route.

6. Method according to claim 4, characterised in that in calculating the visit time needed for the visit to the interesting point on route, the types of roads to be used on the way to the interesting point on route are taken into account.

7. Method according to claim 4, characterised in that in calculating the visit time needed for the visit to the interesting point on route, the previous driving behaviour of the user is taken into account.

8. Method according to claim 4, characterised in that the interesting points on route are pre-determinable by the user.

9. Method according to claim 4, characterised in that categories of interesting points on route are pre-determinable by the user.

\* \* \* \* \*